United States Patent [19]
Cáceres et al.

[11] Patent Number: 5,802,554
[45] Date of Patent: Sep. 1, 1998

[54] METHOD AND SYSTEM FOR REDUCING MEMORY ACCESS LATENCY BY PROVIDING FINE GRAIN DIRECT ACCESS TO FLASH MEMORY CONCURRENT WITH A BLOCK TRANSFER THEREFROM

[75] Inventors: Ramón Cáceres, New York, N.Y.; Brian Bershad, Seattle, Wash.; Brian D. Marsh, New York, N.Y.; Frederick Douglis, Somerset, N.J.

[73] Assignee: Panasonic Technologies Inc., Princeton, N.J.

[21] Appl. No.: 813,011

[22] Filed: Mar. 5, 1997

Related U.S. Application Data

[63] Continuation of Ser. No. 395,965, Feb. 28, 1995, abandoned.

[51] Int. Cl.$^6$ .................................................. G06F 12/00
[52] U.S. Cl. ............................ 711/103; 364/DIG. 1; 364/243.4; 365/49; 365/185.33; 711/5; 711/118; 711/205
[58] Field of Search .................... 364/DIG. 1, 243.4; 365/49, 185.33; 711/5, 103, 118, 119, 205

[56] References Cited

U.S. PATENT DOCUMENTS

| | | | |
|---|---|---|---|
| 3,896,419 | 7/1975 | Lange et al. | |
| 4,056,845 | 11/1977 | Churchill, Jr. | 711/127 |
| 4,169,284 | 9/1979 | Hogan et al. | 711/140 |
| 4,467,419 | 8/1984 | Wakai | 711/118 |
| 4,835,678 | 5/1989 | Kofuji | 711/118 |
| 4,912,636 | 3/1990 | Magar et al. | 395/291 |
| 4,933,846 | 6/1990 | Humphrey et al. | 395/287 |
| 5,073,851 | 12/1991 | Masterson et al. | 711/140 |
| 5,119,485 | 6/1992 | Ledbetter, Jr. et al. | 711/146 |
| 5,185,875 | 2/1993 | Chinnaswamy et al. | 711/121 |
| 5,196,772 | 3/1993 | Bergendahl et al. | 257/78 |
| 5,276,845 | 1/1994 | Takayama | 395/847 |
| 5,283,883 | 2/1994 | Mishler | 395/853 |
| 5,293,597 | 3/1994 | Jensen et al. | 711/207 |
| 5,293,603 | 3/1994 | MacWilliams et al. | 395/309 |
| 5,293,609 | 3/1994 | Shih et al. | 711/137 |
| 5,311,462 | 5/1994 | Wells | 365/49 |
| 5,353,256 | 10/1994 | Fandrich et al. | 365/230.03 |
| 5,369,754 | 11/1994 | Fandrich et al. | 395/430 |
| 5,386,552 | 1/1995 | Garney | 395/575 |
| 5,530,673 | 6/1996 | Tobita et al. | 365/185.09 |

Primary Examiner—Tod R. Swann
Assistant Examiner—Tuan V. Thai
Attorney, Agent, or Firm—Ratner & Prestia

[57] ABSTRACT

A system and method for reducing access latency to stable storage are described. A technique referred to as fault trickling is used to improve access latency to stable storage such as flash memory. In particular, data requests from a central processing unit are preferentially satisfied by a memory management unit providing access to a main memory. When the requested data does not reside in the main memory, however, the memory management unit satisfies the request by providing direct fine-grain access to the flash memory. In addition, concurrently with satisfying the data request directly from the flash memory, a block transfer is initiated from the flash memory to the main memory. Once the block transfer is completed, a memory map, such as an address translation table, is updated to indicate that the data now resides in the more convenient source of data—the main memory. Accordingly, subsequent data requests, for that or proximately located data, can be satisfied by accessing the main memory.

10 Claims, 4 Drawing Sheets

METHOD AND SYSTEM FOR REDUCING MEMORY ACCESS LATENCY BY PROVIDING FINE GRAIN DIRECT ACCESS TO FLASH MEMORY CONCURRENT WITH A BLOCK TRANSFER THEREFROM

This application is a continuation of application Ser. No. 08/395,965 filed Feb. 28, 1995 now abandoned.

BACKGROUND OF THE INVENTION

Computer systems commonly transfer blocks of data from stable storage to main memory before processing by the central processing unit (CPU). The persistent performance disparity between main memory technologies such as DRAM and stable storage technologies such as magnetic disk continues to motivate block-based input/output (I/O) techniques. Examples of these techniques are demand paging in a virtual memory system (see Kilburn et al., "One-level storage system", *IEEE Transactions on Electronics Computers*, April 1962) and maintaining a buffer cache in the file system (see Bach, *The Design of the UNIX Operating System*, 1986).

A new type of non-volatile storage technology, flash memory, has appeared in recent years. Flash memory is a semiconductor integrated circuit technology that provides random bit-level access to storage and holds its contents when power is removed. It offers the non-volatility of magnetic disk, access times comparable to those of dynamic random-access memory (DRAM), and lower power consumption than either.

The current state of the art in flash memory management includes direct access to read-only executable programs or block-based access to read/write data.

Flash memory is regarded as a substitute for magnetic disk in many mass storage applications, particularly in laptop, palmtop, and smaller mobile computers. Systems that use flash memory have the potential to out-perform systems that use magnetic disk because flash memory chips offer much faster access times than magnetic disk drives.

However, flash memory is commonly used in ways that defeat its performance advantages. Most importantly, many flash memory products connect to the CPU through a secondary I/O bus in order to comply with industry standards for removable storage media. Removable flash memory cards offer the convenience of floppy disks and at much higher densities. However, the overhead associated with this two-level configuration adds considerable latency to flash memory accesses. For example, current flash memory chips offer 85-nanosecond access times, while PCMCIA® flash memory cards offer 200-nanosecond access times, a more than twofold increase in latency.

In a two-level bus configuration, flash memory still offers faster access than magnetic disk but slower access than main memory. As with disk-based stable storage, it becomes necessary to transfer data from stable storage to main memory before the majority of accesses to the data are requested by the CPU, or the system will have poor performance. Consequently, flash memory is commonly read and written in large blocks in order to amortize over many operations the access latency to stable storage. Another reason why flash memory products offer a block I/O interface is to remain compatible with existing storage management software written to operate with the long-dominant disk technology. The need to wait until an entire block of storage has been transferred before even one bit can be processed adds further latency to flash memory accesses.

Thus, systems will continue to suffer from significant access latency to stable storage even when such storage is implemented using flash memory.

SUMMARY OF THE INVENTION

The present invention is embodied in a system and method for data processing. The system includes a flash memory, a main memory, a processor for generating requests for data and a memory management unit which, responsive to the requests received from the processor means, provides, when necessary, direct access for the CPU to the data stored in the flash memory.

BRIEF DESCRIPTION OF THE DRAWINGS

The aspects, features and advantages of the present invention will be more readily understood from the following detailed description when read in conjunction with the accompanying drawings, in which.

DETAILED DESCRIPTION

The present invention involves a method and system for accessing data that is stored on a stable storage medium, such as flash memory. Data stored in flash memory may be accessed with a smaller latency than the same data on a disk but with more latency than data from conventional volatile random access memory (RAM). As mentioned, many flash memory products connect to the CPU through a secondary I/O bus to comply with industry standards for removable storage media. This use of a secondary I/O bus degrades potential performance. It should be noted that the present invention does not address the effect on write access to the flash memory or an associated main memory.

The present invention, also referred to in this specification as fault trickling, exploits the fine-grained access capabilities of flash memory to gain back some of the lost performance. Although, the current state of the art in flash memory management includes direct access to read-only executable programs or block-based access to read/write data, until now the coordinated use of these two access techniques as in the fault trickling method have not been known.

Figure 1:
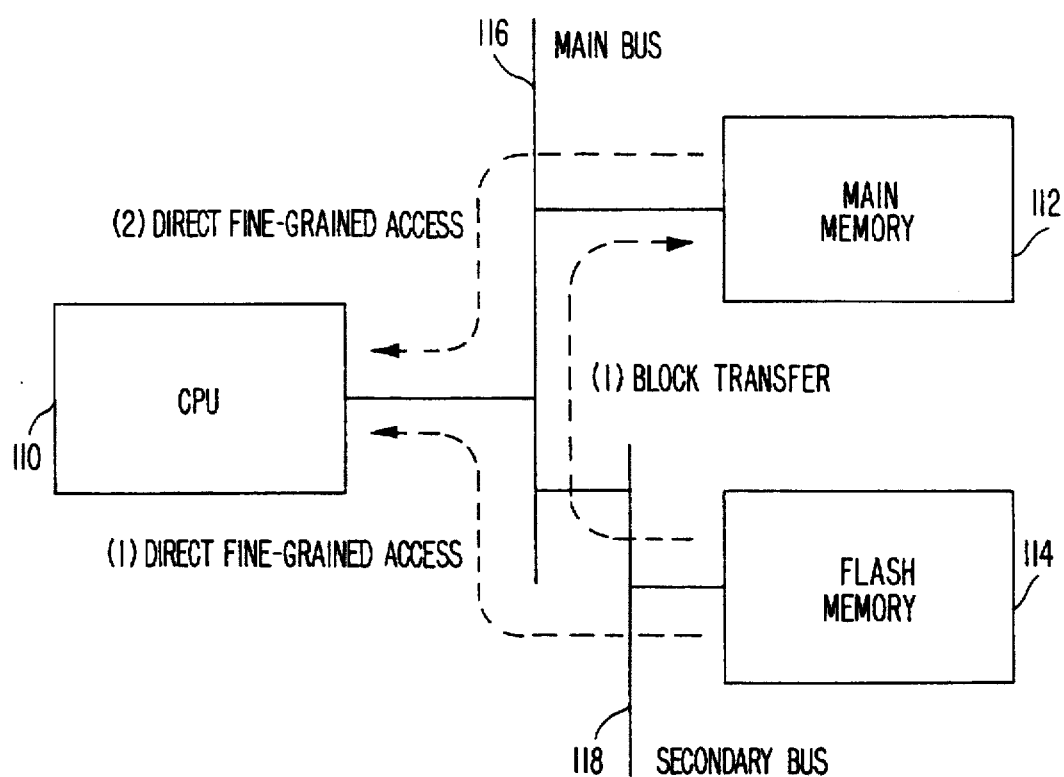
FIG. 1 shows a high-level block diagram of a system suitable for use with the present invention.

FIG. 1 shows a high-level diagram of a system configuration suitable for use with the present invention. In FIG. 1, a central processing unit (CPU) 110 executes instructions and requests data from memory. The requested data may reside in main memory 112 or flash memory 114. CPU 110 is coupled to main memory 112 by way of primary system bus 116 (i.e., a single-layer bus configuration). Whereas, CPU 110 is coupled to flash memory 114 via primary bus 116 and secondary bus 118. In the exemplary embodiment of the present invention, the flash memory 114 is not connected directly to the primary system bus 116. A memory management unit (MMU) (not shown in FIG. 1), which is described in detail below with reference to FIG. 4, may be used to manage the access of CPU 110 to either memory as well as to manage transfers of data between memories.

In the present invention, CPU 110 is provided with direct fine-grain access to main memory 112 and flash memory 114. Direct access to flash memory 114 is made possible by the random access capabilities of flash memory and by support for memory-mapped input/output (I/O), which is provided by well known I/O memory map techniques.

According to the present invention, when data is requested, the MMU (shown in FIG. 4) determines whether the data is available from main memory 112 or if CPU 110 needs to access flash memory 114 to fetch the data. If the data is not in main memory 112, the data is individually fetched from flash memory 114 with fine-grain access and, at the same time or immediately thereafter, a corresponding block of data is transferred from flash memory 114 to main memory 112. It should be noted that the unit of data transferred from flash memory 114 to main memory 112 is typically much larger than the data directly accessed from flash memory 114 (e.g., several kilobytes versus several bytes).

In a conventional cache, the entire block of data would be stored into a main memory before the request for the data by CPU 110 could be satisfied. In the present invention, however, single word accesses to the flash memory 114 for data in the block are permitted and are satisfied while the block is being fetched via well known direct memory access (DMA) techniques.

It should be noted that after the block of data is transferred from flash memory 114 to main memory 112, any subsequent or unprocessed requests for data which have been transferred to main memory 112 are satisfied from the copy of the block in main memory 112. It is also contemplated that the transfer from flash memory 114 to main memory 112 could be performed as groups of smaller individual blocks each with a separate starting address such that subsequent or unprocessed requests for data which has already been transferred to main memory 112 can be completed from main memory 112 before the entire block is transferred to main memory 112.

In general, the present invention provides the advantageous result of reducing access latency to flash memory-based stable storage. In short, the present invention overlaps or interleaves two operations in time: direct access to individual words of stable storage (e.g., flash memory 114) and the transfer of a large block of data from stable storage (e.g., flash memory 114) to main memory 112. As a result, data is available for processing earlier than if CPU 110 had to wait for the block transfer to complete. In addition, once the block transfer completes, the block is available in main memory where data can be accessed faster than in stable storage.

Figure 2:
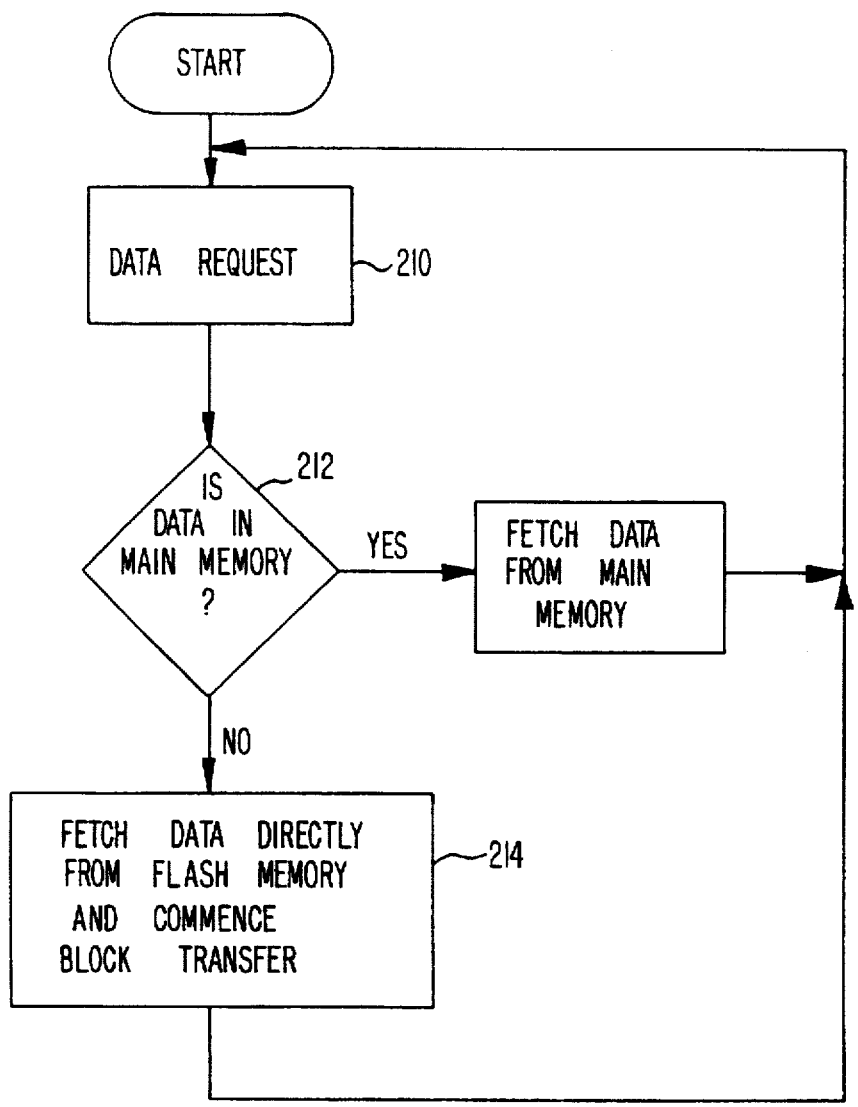
FIG. 2 shows a high-level flowchart illustrating the steps performed during use of an exemplary embodiment of the present invention.

FIG. 2 is a flow chart illustrate the steps of the present invention. As seen in FIG. 2, step 210, on a first request for data in a block of stable storage, it is determined whether the data resides in main memory 112 or flash memory 114, step 212. It should be noted that, in the exemplary embodiment of the present invention, this determination is done by employing an address translation table (ATT) such as a translation-look aside buffer (TLB) (shown in FIG. 4) which translates the requested virtual address into the physical address for the data based on the memory (main or flash) in which the data is stored.

If, in step 212, the data is found to be stored in flash memory 114, the data request is honored directly from flash memory and a block transfer from flash memory 114 to main memory 112 is commenced, step 214. In the exemplary embodiment of the invention, while the block transfer of step 214 is in progress, subsequent requests for data are honored directly from flash memory 114. After the block transfer is complete, further requests for data are honored from the new copy in main memory 112.

Figure 3:
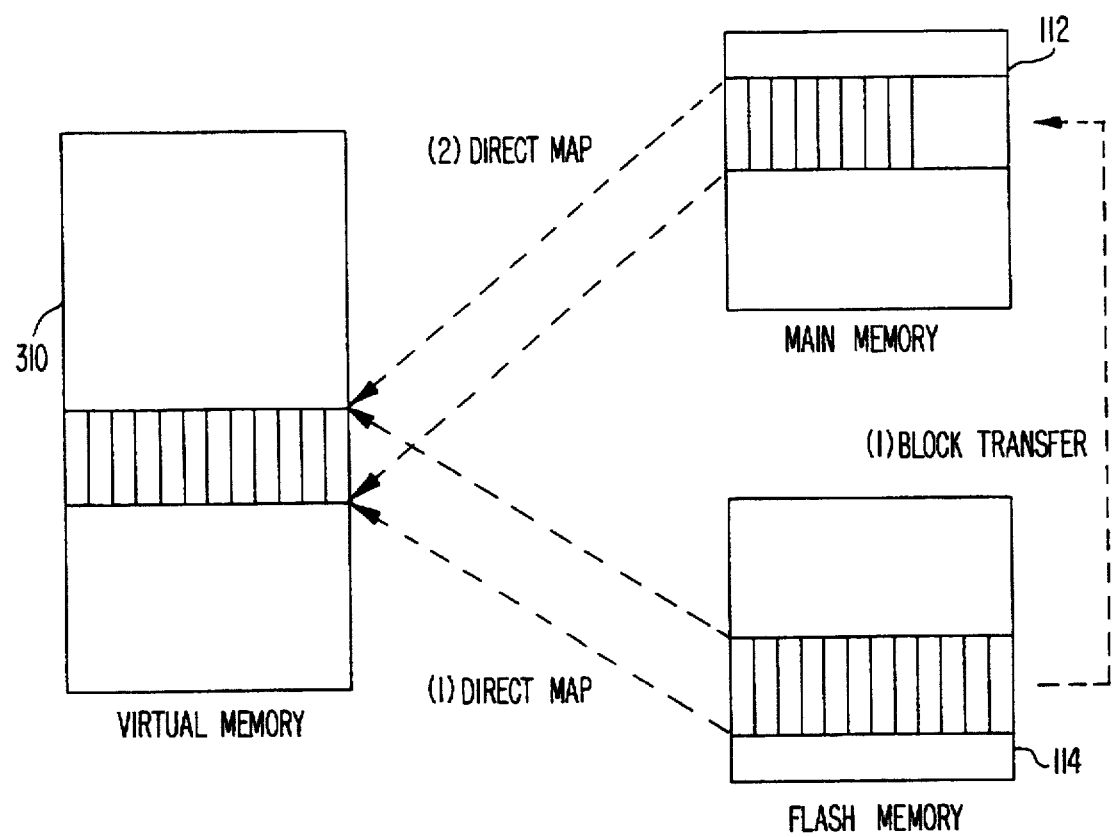
FIG. 3 shows a high-level block diagram illustrating an exemplary virtual memory map employed by the present invention for the main and flash memories of FIG. 1.

FIG. 3 is a functional block diagram which shows how data stored in the main memory 112 and flash memory 114 are mapped into a virtual memory space 310. The present invention directly maps data from flash memory to virtual memory while it performs the block transfer between flash memory 114 and main memory 112. It should be noted that the memory map is updated after each block transfer so the copy of data now located in main memory 112 is accessed once the block transfer is complete.

Figure 4:
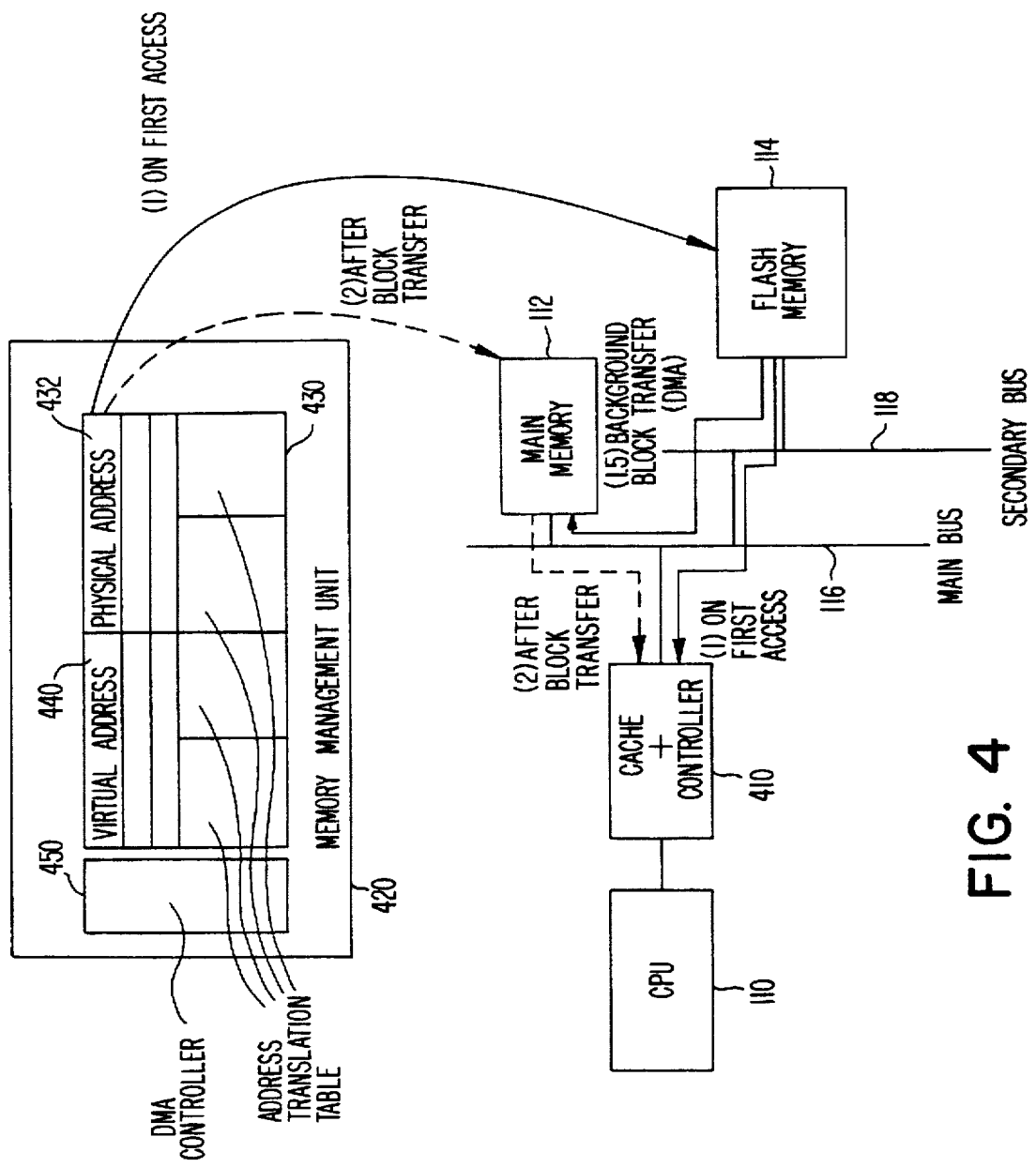
FIG. 4 shows a functional block diagram illustrating the architecture of FIG. 1 with a memory management unit.

FIG. 4 is a functional block diagram similar to FIG. 1 with additional detail regarding the MMU 420. As shown in FIG. 4, CPU 110 is coupled to cache/controller 410 which is coupled to what is essentially a "backing memory store". The backing memory store includes main memory 112, flash memory 114, primary bus 116 and secondary bus 118. Additionally, backing memory store includes a memory management unit (MMU) 420, employing an address translation table 430 and a DMA controller 450, which is coupled to primary bus 116. It is contemplated that MMU 420 may be configured within a particular architecture based on optimum efficiency of operation including being part of a CPU module which would include CPU 110 or possibly coupled to secondary bus 118. MMU 420 performs several functions including:

1) managing the memory (i.e., main and/or flash) which is to be accessed, based on a data request, 2) controlling direct access to the necessary memory, and 3) conducting block transfers from flash memory 114 to main memory 112.

As indicated by the solid line drawn from address translation table (ATT) 430 to flash memory 114, on a first access, the memory map in ATT 430 maps the virtual address 440 supplied by the CPU 110 to the physical address 432 of flash memory 114.

It should be noted that, in the exemplary embodiment of the present invention, a "first access" is considered any request for data by CPU 110 in which the data is not already stored in the main memory 112.

Continuing with FIG. 4, upon a first access, MMU 420 directs a direct fine-grain access of the requested data from flash memory 114 back to CPU 110. Concurrently, MMU 420 directs a block transfer of data, substantially larger than the original request, from flash memory 114 to main memory 112 using DMA controller 450 and well known DMA transfer techniques. As appreciated by those skilled in the art, MMU 420 sequences through a block of addresses, based on the address of the first access (or initial request), and concurrently controls many of the control input signals (not shown) for each of the memories such as chip enable, read/write, chip select, etc. For example, if the address of the first access is 0100 h then the block transferred from flash memory 114 to main memory 112 may be from address 0000 h to 0200 h.

At the completion of the block transfer, ATT 432 is modified to reflect the more convenient location of data for the virtual address to be located in main memory. It should be noted that, in the exemplary embodiment, it is MMU 420 which modifies ATT 432. Additionally, MMU 420, in the exemplary embodiment, performs memory management for main memory 112 by tracking which areas of main memory 112 contain valid data and which areas of main memory 112 are eligible to overwritten to receive a block transfer of data from flash memory 114.

Thus, as indicated by the dotted line drawn from ATT 432 to main memory 112, on a second or subsequent access of the same virtual address, the memory map in ATT 432 may be, for example, an associative memory which maps the virtual address located in the virtual address area 440 to the appropriate physical address, located in the physical address area 432, corresponding to main memory 112.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A data processing system including:
   a flash memory device for storing data;
   a main memory device, separate from the flash memory device, and having a relatively faster access time than the flash memory device, for storing data;
   processor means for generating requests for data;
   a memory management unit which, responsive to the requests received from the processor means, provides direct single word access by the processor means to data stored in the flash memory device when a data request by the processor means is for data not presently stored in the main memory device, said memory management unit including:
   means for concurrently transferring blocks of data, including the data requested by the processor, from the flash memory device to the main memory device when a data request by the processor means is for data not presently stored in the main memory device, and
   means for comparing each request for data received from the processor to the data that has been transferred to the main memory device to preferentially provide the requested data from the main memory device.

2. The data processing system of claim 1, wherein the memory management unit is also for concurrently transferring blocks of data, including the data requested by the processor, from the flash memory device to the main memory device when a data request by the processor means is for data not presently stored in the main memory device.

3. The data processing system of claim 1, wherein the memory management unit includes
   an address translation means which, for at least first accesses of stored data, maps a virtual address used by the processor to request data directly to a physical address of the flash memory device.

4. The data processing system of claim 1, wherein the memory management unit includes an address translation table which, for at least first accesses, maps a virtual address used by the processor to request data directly to a physical address of the flash memory device and, after first accesses, maps the virtual address to a physical address of the main memory.

5. A method for accessing data in data processing system including a central processing unit (CPU), a flash memory device and a main memory device comprising the steps of:
   requesting data by the CPU;
   determining that the requested data is not stored in the main memory;
   providing the CPU with direct single word access to the data from the flash memory device;
   providing the accessed data to the CPU;
   memory mapping virtual addresses of data not stored in the main memory device to physical address of the flash memory device;
   concurrently with the direct single word access, commencing a block transfer of data, including the requested data, from the flash memory device to the main memory device; and
   modifying, upon completion of the block transfer, the memory map such that the virtual addresses of data transferred to the main memory now correspond to physical addresses in the main memory rather than physical addresses in the flash memory.

6. The method of claim 5, further comprising the step of concurrently with the directly accessing step,
   commencing a block transfer of data, including the requested data, from the flash memory device to the main memory device.

7. The method of claim 5, further comprising the step of
   memory mapping virtual addresses of data not stored in the main memory device to physical address of the flash memory device.

8. The method of claim 5, further comprising the step of
   comparing the virtual address to an address translation table; and
   determining whether to access the requested data from the main memory device or to access the requested data directly from the flash memory device.

9. A data processing system including:
   processor means for generating requests for data;
   a flash memory device for storing data;
   a main memory device, separate from the flash memory device, and having a relatively faster access time than the flash memory device, for storing data;
   a cache memory device, separate from the flash memory device and the main memory device, and having a relatively faster access time than either the main memory device or the flash memory device, for storing data;
   a memory management unit which, responsive to the requests received from the processor means, provides direct single word access by the processor means to data stored in the flash memory device when a data request by the processor means is for data not presently stored in the main memory device, said memory management unit including an address translation means which, for at least first accesses of stored data, maps a virtual address used by the processor to request data directly to a physical address of the flash memory device, said memory management unit including:
   means for concurrently transferring blocks of data, including the data requested by the processor, from the flash memory device to the main memory device when a data request by the processor means is for data not presently stored in the main memory device, and
   means for comparing each request for data received from the processor to the data that has been transferred to the main memory device to preferentially provide the requested data from the main memory device.

10. A method for accessing data in data processing system including a central processing unit (CPU), a cache memory device, a main memory device separate from the cache memory device and a flash memory device separate from both the cache and main memory devices, the method comprising the steps of:

requesting data by the CPU;

providing the CPU with direct single word access to the data in the flash memory device by mapping virtual addresses of data not stored in the main memory device to physical addresses of the flash memory device by way of a memory management unit;

concurrently with the direct single word access, commencing a block transfer of data, including the requested data, from the flash memory device to the main memory device; and modifying, upon completion of the block transfer, the memory map such that the virtual addresses of data transferred to the main memory now correspond to physical addresses in the main memory rather than physical addresses in the flash memory.

* * * * *

UNITED STATES PATENT AND TRADEMARK OFFICE
CERTIFICATE OF CORRECTION

PATENT NO. : 5,802,554
DATED : September 1, 1998
INVENTOR(S) : R. Caceres et al.

It is certified that error appears in the above-identified patent and that said Letters Patent is hereby corrected as shown below:

Title page, add under Other Publications headings "T. Kilburn et al., "One-Level Storage System", IRE Transactions on Electronic Computers, Vol. EC-11(2), pp. 223-235 (April 1962)"

Title page, add under Other Publications headings "Markus Levy, "Interfacing Microsoft's Flash File System", Memory Products, pp. 4-318-4-325, Intel Corp. (1991)"

Title page, add under Other Publications headings "Pashley, et al., Intel Corporation, "Flash Memories: The Best of Two Worlds", IEEE Spectrum, pp. 3-683-687 (Dec. 1989)"

Title page, add under Other Publications headings, "Verner, Don, "eXecute-In-Place", Memory Card Magazine, pp. 4-316-317 (March/April 1991)"

Signed and Sealed this

Sixteenth Day of February, 1999

Attest:

*Attesting Officer*

*Acting Commissioner of Patents and Trademarks*